(12) United States Patent
Watkins

(10) Patent No.: US 6,215,518 B1
(45) Date of Patent: Apr. 10, 2001

(54) HEADREST AND SEAT VIDEO IMAGING APPARATUS

(76) Inventor: D. Scott Watkins, 4075-A Nine McFarland Dr., Alpharetta, GA (US) 30004-3389

( * ) Notice: Subject to any disclaimer, the term of this patent is extended or adjusted under 35 U.S.C. 154(b) by 0 days.

(21) Appl. No.: 09/398,910

(22) Filed: Sep. 14, 1999

Related U.S. Application Data

(63) Continuation-in-part of application No. 09/252,265, filed on Feb. 18, 1999, which is a continuation-in-part of application No. 09/121,155, filed on Jul. 22, 1998.

(51) Int. Cl.⁷ .................................................. H04N 7/18
(52) U.S. Cl. .................... 348/148; 297/238; 297/217.4; 296/37.6; 386/46
(58) Field of Search ........................... 348/61, 143, 148, 348/149, 151, 158; 396/419, 427, 429, 661

(56) References Cited

U.S. PATENT DOCUMENTS

| | | | |
|---|---|---|---|
| 277,650 | 5/1883 | Wright | 355/75 |
| 765,980 | 7/1904 | Mercier | 396/329 |
| 2,464,067 | 3/1949 | Barker | 95/11 |
| 2,481,717 | 9/1949 | Blair | 248/183 |
| 2,574,007 | 11/1951 | Anderson | 255/51 |
| 2,614,471 | 10/1952 | Markowitz | 95/86 |
| 2,794,512 | 6/1957 | Martin | 181/5 |
| 2,794,612 | 6/1957 | Clifton | 248/161 |
| 2,876,688 | 3/1959 | Laue | 95/11 |
| 3,128,982 | 4/1964 | Christopher | 248/183 |
| 3,141,393 | 7/1964 | Platt | 95/1.1 |
| 3,349,679 | 10/1967 | Lohman | 95/11 |
| 3,515,472 | 6/1970 | Schwitzgebel | 352/132 |
| 3,545,710 | 12/1970 | Mooney | 248/183 |
| 3,598,355 | 8/1971 | English | 248/430 |
| 3,752,376 | 8/1973 | Shelton et al. | 224/42.45 B |
| 3,951,448 | 4/1976 | Hawie | 297/113 |
| 3,970,274 | 7/1976 | Resk | 248/185 |
| 4,029,246 | 6/1977 | Woodruff | 224/42.45 B |
| 4,328,915 | 5/1982 | Melton, III | 224/32 R |

(List continued on next page.)

FOREIGN PATENT DOCUMENTS

| | | |
|---|---|---|
| 167405 | 1/1951 | (DE) . |
| 2238993 | 6/1991 | (GB) . |
| 59-11939 | 1/1984 | (JP) . |
| 10-75389 | 3/1998 | (JP) . |

OTHER PUBLICATIONS

Eagleye Dispatch, vol. 2, Summer 1995, Eagleye Technologies, Inc., Rome Georgia.
"The Jo Mount", p. 46, The PI Catalog, Thomas Investigative Publications, Austin, TX 78764, Winter 1997–98.
1190F (Mustang) Front sear head rest and related parts—Mustang convertible, CPD 2000 Version 10.07, Apr. 1998.
1997 A (Ford), Front seat mechanism—upper half—power—drivers side, CPD Version 10.07, Apr. 1998.

Primary Examiner—Chris S. Kelley
Assistant Examiner—Shawn S. An
(74) Attorney, Agent, or Firm—Baker, Donelson, Bearman & Caldwell

(57) ABSTRACT

A video imaging apparatus for receiving, recording, and displaying images from a motor vehicle in which the video camera rigidly connects to a support member in a headrest protion of a seat in the motor vehicle. A video recorder mounts in a slidable drawer in a seat cushion, which drawer is selectively moveable from a first position recessed in the seat to a second position outwardly of the seat for selective access to the video recorder. The video recorder communicates with the video camera, as well as with a image display device mounted within the motor vehicle.

14 Claims, 5 Drawing Sheets

U.S. PATENT DOCUMENTS

| | | | |
|---|---|---|---|
| 4,645,320 | 2/1987 | Muelling | 354/81 |
| 4,974,807 | 12/1990 | Moineau | 248/539 |
| 5,230,490 | 7/1993 | Sloop | 248/187 |
| 5,260,731 | 11/1993 | Baker, Jr. | 354/81 |
| 5,282,182 | 1/1994 | Kreuzer | 369/21 |
| 5,366,194 | 11/1994 | Finney | 248/218.4 |
| 5,446,659 | 8/1995 | Yamawaki | 364/424.03 |
| 5,664,840 | 9/1997 | Stenzel | 297/391 |
| 5,677,979 | 10/1997 | Squicciarini | 386/46 |
| 5,742,859 | 4/1998 | Acker | 396/419 |
| 5,775,771 * | 7/1998 | La Cour | 297/238 |
| 5,833,101 | 11/1998 | Watkins | 224/275 |
| 5,883,739 | 3/1999 | Ashihara | 359/462 |
| 5,895,086 * | 4/1999 | Carico | 296/37.6 |

* cited by examiner

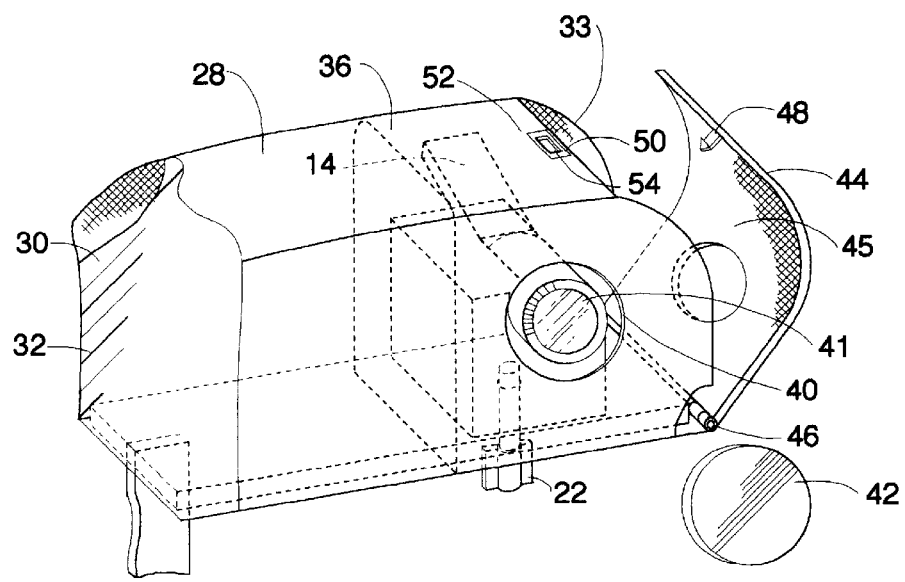
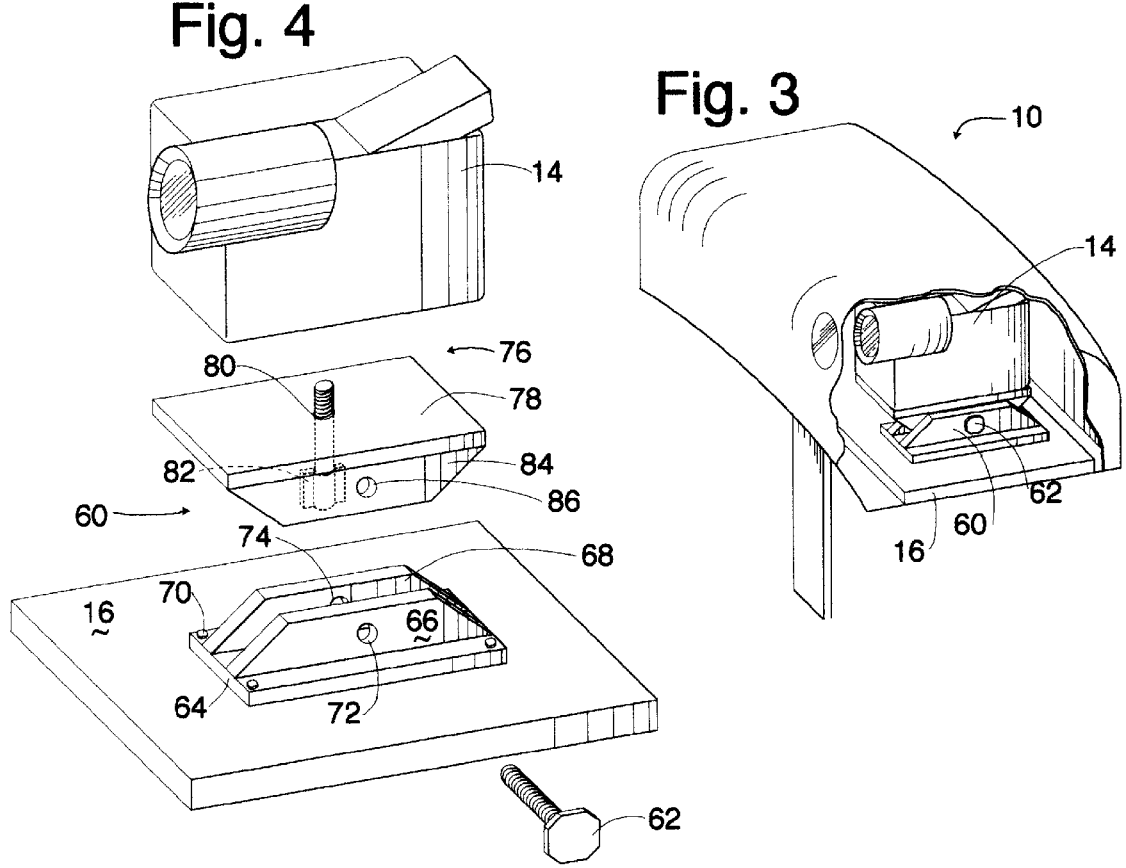

HEADREST AND SEAT VIDEO IMAGING APPARATUS

The present application is a continuation-in-part of U.S. Ser. No. 09/252,265, filed Feb. 18, 1999, as a continuation-in-part of co-pending U.S. Ser. No. 09/121,155 filed Jul. 22, 1998.

TECHNICAL FIELD

The present invention relates to apparatus for mounting video imaging equipment in motor vehicles. More particularly, the present invention relates to video and audio imaging apparatus incorporated with seats in motor vehicles.

BACKGROUND OF THE INVENTION

In recent years, military, taxis, private persons, police and private detectives have added video cameras to their equipment list for video recording of activities, persons, races, passing scenes, patrols and investigations. For police particularly, the video camera provides a visual record of events such as traffic stops, chases, and other incidents of law enforcement. Private detectives also record incidents for evidentiary purposes during investigations.

Various devices have been provided for supporting video cameras in motor vehicles. Stationary investigations allow use of tripods mounted in the motor vehicle to support the video cameras. The tripod readily stands in many vans or other trucks which have room for the legs to spread and thereby provide a stable foundation for using a video camera attached thereto. Tripods however are not readily adaptable for use in passenger vehicles which have limited space in the rear seat portion of the car. Generally, the legs are insufficiently separated for image recording stability.

For military, taxi, and police vehicles particularly, video cameras typically mount on U-shaped brackets attached to the forward portion of the roof adjacent the windshield. The bracket receives the video camera for a forward view through the windshield in order to provide a record of traffic stops, automobile chases, and the like. Other camera mounts have been used to secure video or television cameras within automobiles, such as race cars to provide a driver's perspective during an automobile race being broadcasted on television. One known device for mounting a camera in a car maintains the camera level with respect to the roads surface regardless of acceleration or gravitational forces. The camera is supported on a pendulum suspended from a gimble and constrained with spring and damping elements which match the vehicle suspension system in order to produce equal and opposite rotations of the pendulum in response to the movements of the vehicle.

Other devices are less complicated. One such device mounts a camera in a protective box which attaches to the rear deck of the vehicle near the back window. Telescoping members connect the box to the rear deck. Coil springs absorb shock in order to dampen vibrations communicated to the camera. Another device provides a channel member with a depending plate at one end. The plate is received in a slot of an upper edge of a car seat which normally receives a tongue or support member of a headrest. A distal end of the channel rests on top of the dashboard of the vehicle. A camera mounts with a bolt through an opening in the channel. An elastic hold-down and stabilizing cord is used to secure the distal end of the channel to the dashboard.

My U.S. patent application Ser. No. 08/919,298 discloses a transverse bar which connects at opposing distal ends to the supports for headrests in the seats of motor vehicles. The video camera mounts to a pivotable support attached to the transverse bar, whereby the camera may be oriented at a selected angle for recording.

While these devices have generally functioned to support a camera within a car, there are drawbacks to their use. Mounting the camera on a rear deck of a car does not satisfactorily show dashboard information which is useful and important during automobile races. Also this perspective view differs from that seen by the driver. On the other hand, placing the camera closer to the windshield may have the camera to far forward to show the dashboard of the car which had key gauges, such as the speedometer, displaying information about the car. Brackets which are cantilevered in the car are susceptible to vibration as the distal end is not adequately secured. Further, such brackets that mount to the seat slot for headrest supports occupies one of the headrests and takes the space otherwise occupied by a passenger.

Also, surveillance security and other police activities however need the camera to be less visible from casual observation, which the present devices do not provide.

Further, while some video cameras incorporate a recording apparatus within the camera, often, the recorder is a separate component connected to the video camera by communication cables. As a separate component, the recorder is usually permanently mounted to a portion of the wall of the trunk of the motor vehicle. This makes access to the recorder and tapes cumbersome, time consuming, and unsatisfactory. Space within a police vehicle however is at premium for storage of equipment and materials. The video recorder needs to be secure so that it is not independently moving while the vehicle is traveling, yet must be readily and easily accessible for retrieval and exchange of recording tapes.

Accordingly, there is a need in the art for improved mounts for video recording equipment in motor vehicles. It is to such that the present invention is directed.

BRIEF SUMMARY OF THE INVENTION

The present invention meets the need in the art by providing a video and audio imaging apparatus incorporated with a motor vehicle seat for positioning in a motor vehicle for receiving video and audio images. The apparatus comprises a frame for a seat having cushioning pads thereon defining a seat portion and a seat back portion. The frame defines a shape of the seat and the seat back portions. The seat back portion has a headrest portion. A cover encloses the frame. The seat back further defines a second portion spaced-apart and lateral of the headrest portion, which second portion includes means for mounting a video imaging apparatus thereto. A drawer is slidably received within the seat portion for moving between a first position recessed within the seat and a second position extending outwardly of the seat for accessing a video image recorder secured within the drawer. The video image recorder is operatively connected with a control cable to the video imaging apparatus mounted to the seat back portion. A controller selectively operates the camera and the recorder for recording images.

Objects, advantages and features of the present invention will become apparent from a reading of the following detailed description of the invention and claims in view of the appended drawings.

BRIEF DESCRIPTION OF THE DRAWINGS

FIG. 2 is a cutaway detailed illustration of the headrest camera mount illustrated in FIG. 1.

FIG. 3 is a side cutaway view of an embodiment of the headrest camera mount including a support or pivotally positioning the camera at a selected angle.

FIG. 4 is a detailed exploded perspective view of the camera mount illustrated in FIG. 3.

DETAILED DESCRIPTION OF THE PREFERRED EMBODIMENTS

Figure 1:
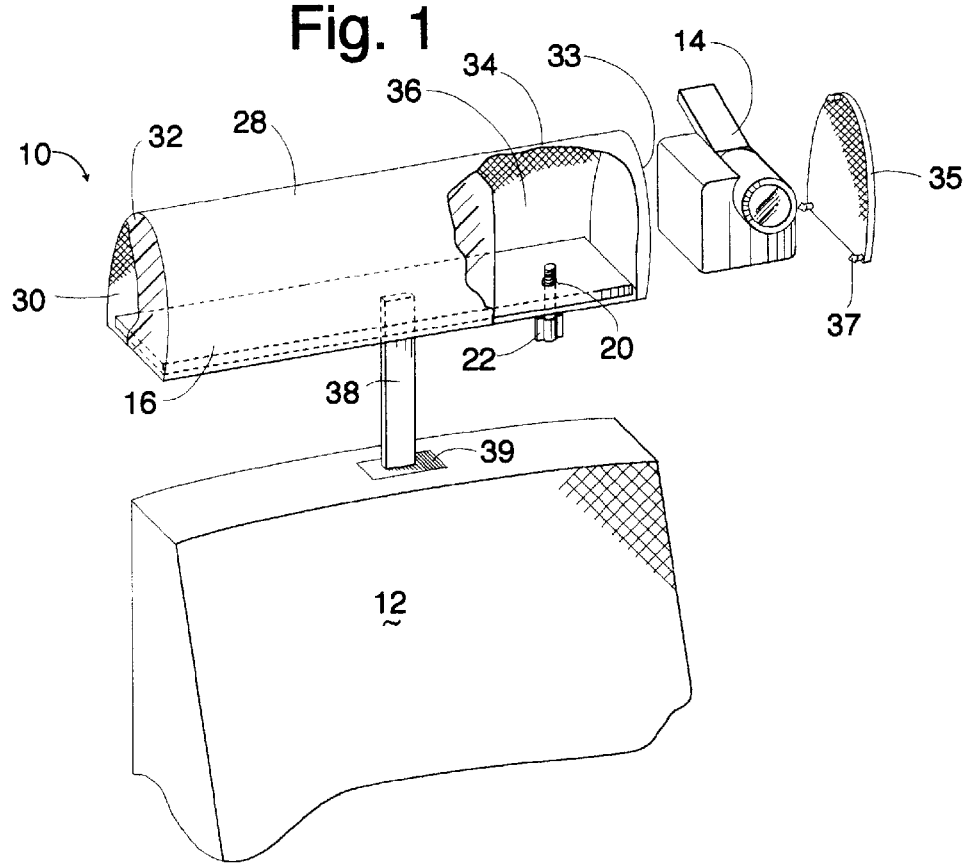
FIG. 1 illustrates in perspective view a headrest camera mount for attaching to the seat of a motor vehicle, according to the present invention.

Referring now in more detail to the drawings in which like parts have like identifiers, FIG. 1 illustrates in perspective view a headrest 10 that attaches to a seat 12 of a motor vehicle while containing a video camera 14 shown exploded away. The headrest 10 has an elongate member 16 in which a distal end 18 defines a bore 20. A threaded connector 22 extends through the bore 20. The connector 22 includes a groove which receives a C-ring. The C-ring conventionally prevents the connector 22 from coming out to the bore 20.

A cushion 28 for the headrest 10 includes a resilient cover 30 that encloses a foam core 32. The cushion 28 attaches conventionally to the elongate member 16. The core 32 does not extend the full length of the elongate member, so that a portion 34 of the cover 30 defines a cavity 36. The cavity 36 receives the video camera 14, which has a threaded bore in a bottom surface for engaging the connector 22. The video camera 14 thereby sits on the elongate member 16 and the connector 22 secures the video camera to the member. The headrest 10 defines an open end 33. The headrest 10 defines an open end 33 which is covered by a removable detachable plate 35. Pins 37 extend laterally from the plate 35 for engaging mating portions of the cover 30, whereby the headrest has a selectively closed distal end. Further, removal of the plate 35 permits access to control buttons on the video camera 14. A support 38 attaches conventionally to the member 16 and depends away from the headrest 10. The support 38 is received within a slot 39 in the seat 12 for connecting the headrest 10 to the seat 12.

As shown in FIG. 2, a front surface of the cover 30 defines an opening 40 through which a lens 41 receives light for communicating an image to the video camera 14. A detachable cap 42 exploded from the headrest 10 covers the opening 40 when the video camera 38 is removed or is not in use. In the embodiment illustrated in FIG. 2, the open end 33 is a closed by a door 44 that defines a side face of the cushion 28. The door 44 attaches along a hinge 46 to a lower portion of the cover 30. In the illustrated embodiment, the door 44 also defines an open port 45, which may be closed by a detachable cover (not illustrated) for a purpose discussed below. Other doors may be gainfully used; for example, a door which slides from a closed position to an open position. A pin 48 projects laterally from a distal portion of the door 44. A plate 50 attaches to an upper portion 52 of the side of the headrest 10. The plate 50 defines an opening 54 for receiving the pin 48 when the door for selectively holding the door closed. As may be appreciated by one of ordinary skill in the art, a back surface of the headrest 10 likewise may include an opening for the lens of video camera to record images from a rearward perspective. In an alternate embodiment, a recorder separate from the camera is mounted in the motor of the seat is an extension of the seat back, and may be planer, or arcuate, to conform in style to the seat. In the particular illustrated embodiment, the core body has a main portion that defines a first concave recess 100 on a forward face of the core body. The recess 100 receives a head of a person occupying the seat. A second portion 102 of the core body 98 defines a second concave recess on the forward face of the core body lateral of the main portion 100. The first and second recesses 100 and 102 are separated by a forwardly projecting ridge 104. In an alternate embodiment (not illustrated), the second portion 103 defines a planer forward face. It should be noted that the ridge 104 cooperates with the extending opposite side of the recess 100 to receive the head of a seat occupant, while restricting the head from inadvertently blocking the view of the video camera 14.

The cavity 94 is defined within the second portion of the core body 102. A port in a side wall of the seat 90 is closed by a cover 106. The frame 96 engages a support member which defines a bore for receiving a threaded connector to which the video camera 14 is secured. The forward surface of the headrest 92 defines an opening in the second recess 102 whereby the lens of the video camera receives light for recording images. It is the noted that the support 60 illustrated in FIG. 3 may gainfully be installed in the cavity 94 for selectively positioning the video camera 14 in the integral seat back 90 for recording images.

Figure 6:
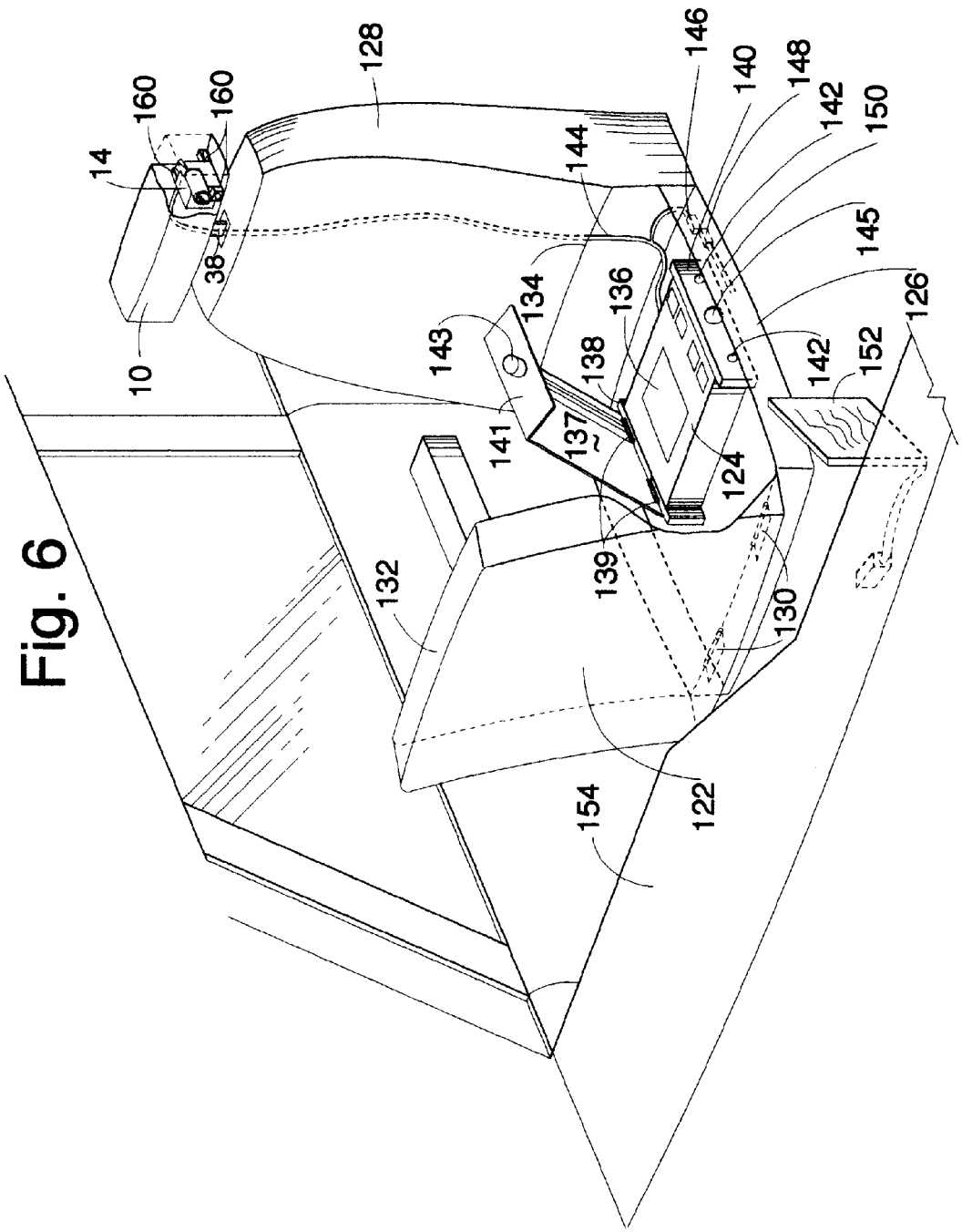
FIG. 6 is a perspective view of a seat in a motor vehicle including the video headrest illustrated in FIG. 1, with a pivotable seat cushion for accessing a video recorder mounted in the seat.

FIG. 6 is a perspective view of a seat 120 in a motor vehicle, including the video headrest 10 with a seat cushion 122 shown in a pivoted position for accessing a video recorder 124 mounted within the seat. The seat 120 includes a frame 126 from which a seat back 128 extends. Conventional seatback adjustment mechanism may be included and are not otherwise illustrated for adjusting an angle of the seatback. The headrest 10 includes the camera 14 and mounts on supports 38 which extend from an upper portion of vehicle, for instance in the trunk. A cable (not illustrated) connects between the video camera 14 and the recorder.

FIG. 3 is a side cutaway view of the headrest 10 having a pivot support 6 rigidly connected to the members 16 a bolt 62 locks the pivot support 60 in a selected position whereby the video camera 14 is positioned at a selected angle. FIG. 4 provides a detailed exploded view of the pivot support 60 comprises a base plate 64 having a pair of upwardly extending spaced-apart parallel flanges 66, 68. The base 64 is rigidly connected to the member 16 with a fastener 70 such as bolts, rivets, or the like. The flanges 66, 68 in the illustrated embodiment have a trapezoid shape in end view, with the wider base of the trapezoid integral with the base plate 64. The flange 66 defines a bore 72. The flange 68 defines a threaded bore 74 co-axially aligned with the bore 72.

A pivot plate 76 defines a surface 78 on which the video camera 14 rests. The pivot plate 76 defines a bore 80 which receives a connector 82 for engaging the threaded bore in the video camera 14 whereby the video camera is rigidly connected to the pivot plate 76. A flange 84 depends from the surface 78 at one side. The flange 84 defines a bore 86 which is aligned with the bores 72 and 74 when the flange 84 is positioned between the flanges 66, 68.

Figure 5:
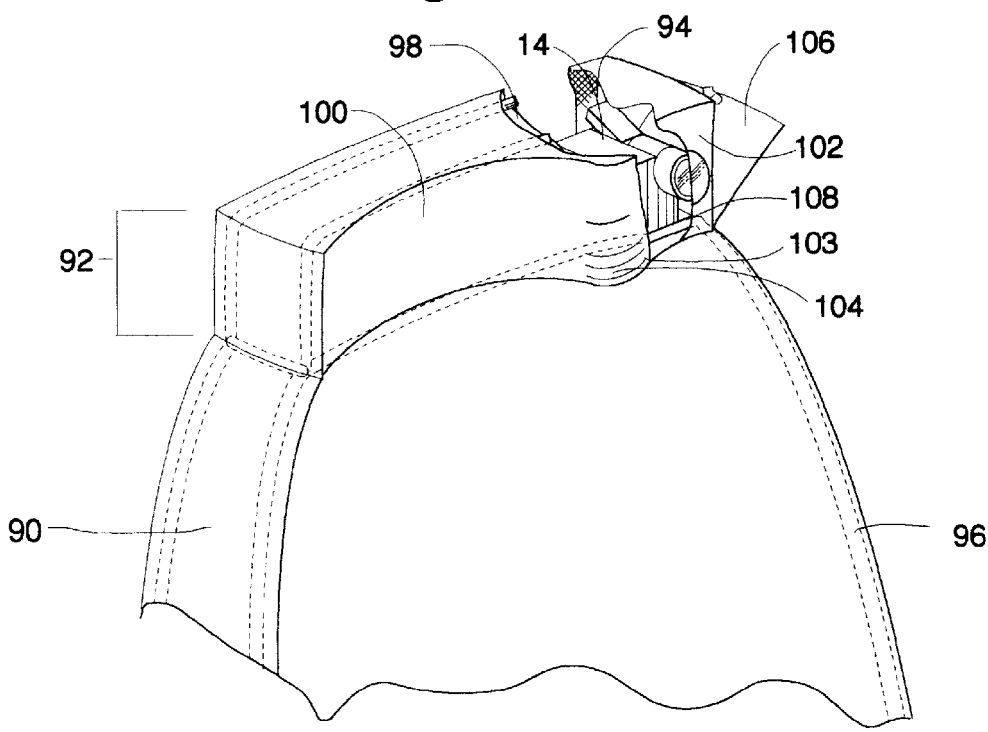
FIG. 5 is a perspective view of a seat back for a motor vehicle having an integral headrest with a camera mount according to the present invention.

FIG. 5 is a perspective view of a portion of a seat back for a seat in a motor vehicle. The seat back 90 includes an integral headrest generally 92 which defines a cavity 94 for receiving the video camera 14. The seat 92 has a frame 96 which defines a perimeter shape of the seat back 90 and the headrest 92. A core member formed of cushioning materials is received by the frame. A seat cover over lies the core member and the frame to define the seat back.

The headrest 92 includes a portion of the core member generally, a core body 98. Typically, the headrest portion the seat back 128. The seat cushion 122 is selectively movable from a first position for sitting and a second position for accessing the video recorder 124. In the illustrated embodiment, the seat cushion 122 connects at a forward edge with hinges 130 to the seat frame 126. The hinges 130 permit the seat cushion 122 to move from the first position with the cushion received within the frame 126 for seating purposes and the second position, as illustrated. In the first position, a back edge 132 of the cushion 122 is received against a lower side face 134 of the seat back 128. The hinges 130 permit the seat cushion 122 to pivot forward, as illustrated, to the second position for providing access to the video recorder 124.

The video recorder 124 includes an access door 136 for receiving a video recording tape (not illustrated). In the illustrated embodiment, a pair of supports 138, 140 are fixedly secured within the seat frame 126 to a floorboard of the motor vehicle. In the illustrated embodiment, a plurality of threaded fasteners 142 extend through the supports 138, 140 to rigidly connect the recorder 124 to the supports. A cover 137 connects with hinges 139 to the support 138. A lip 141 of the cover 137 over hangs the support 140. The lip 141 includes a slot 143 for receiving a key that engages a lock 145 to secure the cover 137 closed over the video recorder 124.

A wiring harness 144 communicates between the recorder 124 and the video camera 14. A coupler 146 connects to a mating coupler 148 of a harness 150 for providing electrical power to the video recorder 124 and the camera 14 as well as providing control wiring for operation of the recorder and the camera. The video camera 14 and the recorder 124 also communicate with a video display screen 152 and can incorporate other functions such as position locating and speed detection devices. In the illustrated embodiment the video display screen 152 mounts in the dashboard 154. The video display screen 152 connects through a harness 156 to the harness 150, 144 for the video recorder 124 and the video camera 14, for display of images received by the camera or on a tape played by the recorder.

As illustrated, the present invention further provides a plurality of video cameras 160 that mount in the headrest 10. It should be appreciated that the video camera 14 is illustrated as a conventional type camera, and it is noted that smaller CCD (charge-coupled devices) functioning as cameras 160 provide the ability to receive images from a forward, side, and rear view. Similar cameras mounted in the adjacent headrest (not illustrated) provides coverage in the remaining side direction. Accordingly, multiple configurations of video image receiving cameras 14, 160 are available. In one embodiment, one video camera is preset for telephoto imaging and a CCD device 160 is preset for wide angle viewing. A controller enables a user to select between the cameras 14, 160 depending on the image to be recorded. For example, the camera 14 preset to telephoto would be used for recording a license plate and car from a long distance.

While the present invention is disclosed with respect to a single headrest in a motor vehicle, it is to be appreciated that the cameras 14, 160 could readily be mounted in the opposing end of the headrest for use on a driver's portion of the seats, whereby the cameras would also receive dashboard information, such as the speed of the motor vehicle or other vehicle speed via a detection device. In the embodiment having a plurality of side, rear, and forward view cameras 14, 160, a camera control module provides functional controls over the cameras and the recorder for on/off, telephoto, and camera selection, whereby the user can readily switch among selected views provided by the cameras. Further, in an alternate embodiment, the seat cushion 122 pivots about the back side, rather than the front. In a second alternate embodiment, the seat cushion 122 pivots from one side. It is noted that the present invention is likewise installable in either a passenger side or a driver side of the seat in the motor vehicle.

In an alternate embodiment, the video equipment communicates with a transmitter placed preferably behind the dashboard for broadcasting a video signal to a remote receiver, such as an operations control center.

Figure 7:
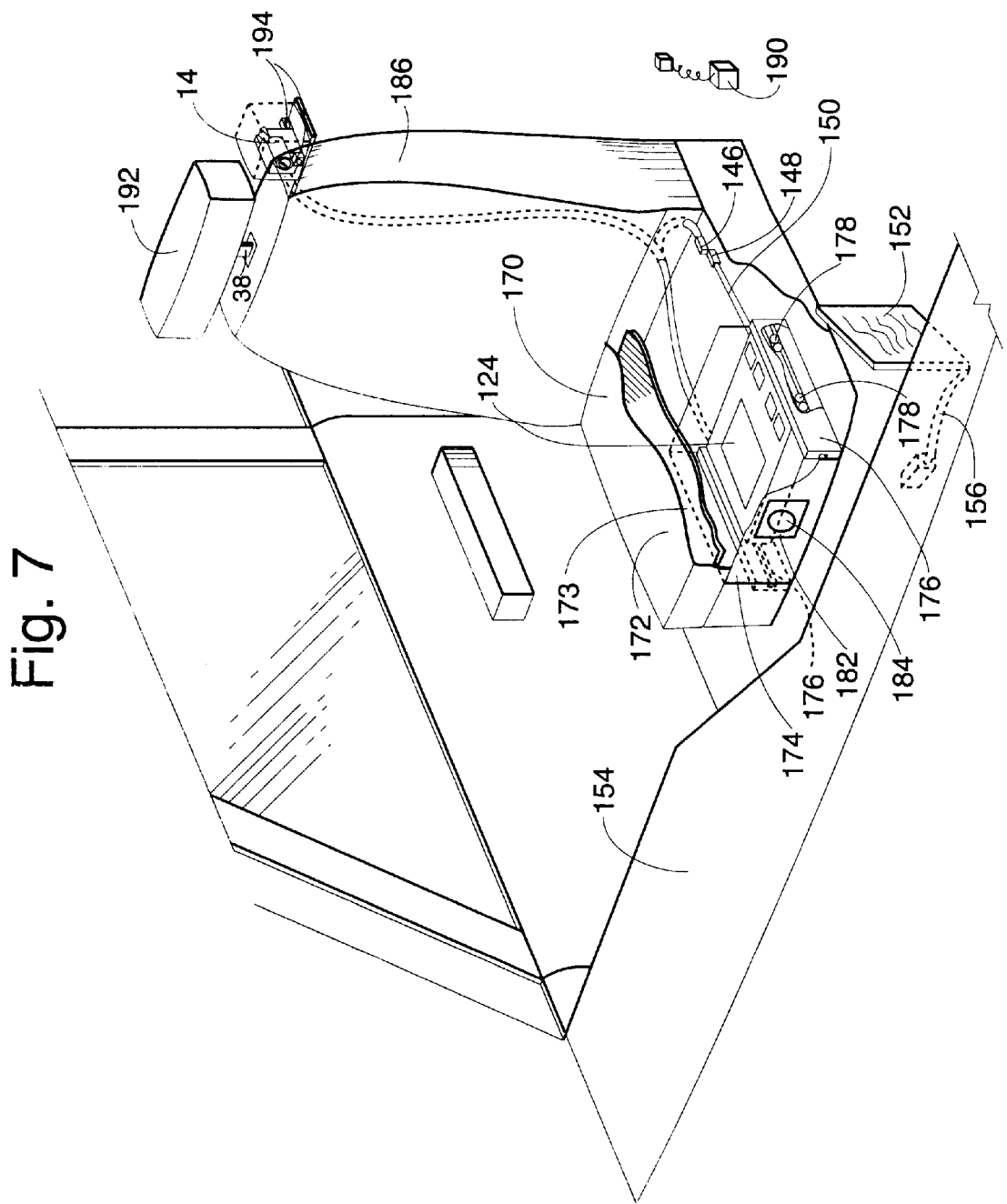
FIG. 7 is a perspective view of a seat in a motor vehicle with a video recorder slidably mounted in the seat.

FIG. 7 is a perspective view of a seat 170 in a motor vehicle, including a seat cushion 172 which encloses a sliding drawer 174 for holding the video recorder 124 mounted within the seat 170. A shield 173, such as a plastic sheet, prevents spilled liquids from entering the video recorder 124. The shield 173 in an alternate embodiment is a metal sheet to further restrict access to the video recorder 124. The video recorder 124 mounts securely, preferably with fasteners such as bolts (not illustrated), into the drawer 174. The sliding drawer 174 has a pair of opposing sliding arms 176 that define a channel in which pairs of aligned roller 178 travel. The rollers 178 connect with axles to the drawer 174; the sliding arms attach to the frame of the seat. Conventional drawer slides may be gainfully used, whereby the drawer 174 is movable from a first position recessed within the seat 170 and a second position outwardly of a forward face 180 of the seat 170. A front panel 182 of the drawer 174 includes a lock 184 for securing the drawer in the first position. The seat 170 includes a frame from which a seat back 186 extends. Conventional seatback adjustment mechanism may be included and are not otherwise illustrated for adjusting an angle of the seatback. One embodiment of this apparatus gainfully uses the headrest 10 that includes the camera 14 and mounts on supports 38 which extend from an upper portion of the seat back 186. The illustrated embodiment has a conventional headrest 192. A support 194 extends laterally from a should portion of the back 186. The support 194 defines at least one hole for receiving a threaded fastener whereby the camera 14 is secured to the support 194. A housing is illustrated in phantom for enclosing the camera 14. In an alternate embodiment, the pivot support 60 is attached to the support 194 for engaging the camera 14.

The wiring harness 144 communicates between the recorder 124 and the video camera 14. The couplers 146, 148 connect to the harness 150 for providing electrical power to the video recorder 124 and the camera 14 as well as providing control wiring for operation of the recorder, the camera, and a microphone for audio signals. The microphone can be a conventional wireless microphone/transmitter such as the vest and shoulder microphone 190 typically used by police or a directly wired microphone for communicating with the video recorder 124. The video camera 14 and the recorder 124 also communicate with a video display screen 152 and can incorporate other functions such as position locating and speed detection devices. In the illustrated embodiment, the video display screen 152 mounts in the dashboard 154. In the illustrated embodiment, the housing for the video display 152 includes a plurality of control buttons for controlling the operation of the video camera 14, the video recorder 124, and the display 152. A controller is disclosed in my patent application Ser. No. 09/353,113, filed Jul. 14, 1999, with the United States Patent and Trademark Office, which application is incorporated herein by reference. The video display screen 152 connects through a harness 156 to the harness 150, 144 for the video recorder 124 and the video camera 14, for display of images received by the camera or on a tape played by the recorder.

As illustrated, the present invention gainfully uses the plurality of video cameras 160, which are preferably the smaller CCD (charge-coupled devices),CMOS, and the like, that function as cameras to provide the ability to receive images from forward, side, and rear views, selectively, with multiple configurations of video image receiving cameras 14, 160. The controller enables a user to select between the cameras 14, 160 depending on the image to be recorded.

Figure 8:
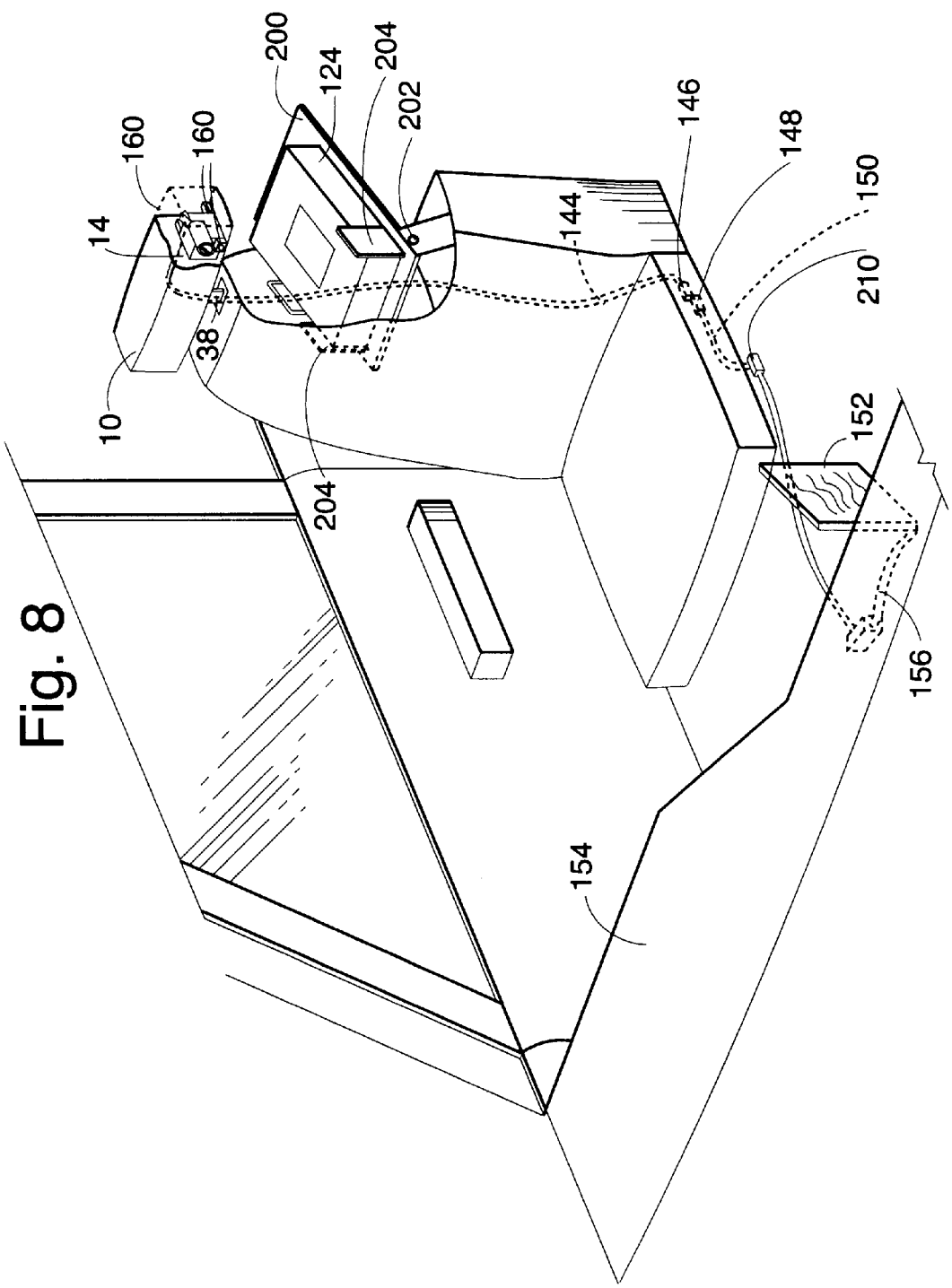
FIG. 8 is a perspective view of a seat in a motor vehicle with a video recorder mounted in the back of the seat.

FIG. 8 illustrates an alternate embodiment in which the video recorder 124 is mounted in the seat back 186. The video recorder 124 connects securely with fasteners to a door 200 that pivots on hinges 202 connected to a member 204 of the seat frame. The door 200 selectively includes a lock (not illustrated) for controlling access to the video recorder. The control cables 144 interconnect the video recorder 124, the camera 14, 160, and the controller/display 152, for operation of the video and audio imaging apparatus, with power supplied from the motor vehicle by a connector generally 210 into the wiring harness 144.

With reference to FIGS. 1 and 2, the video camera headrest mount of the present invention is incorporated in motor vehicles for use in recording images and audio from the motor vehicle. The disclosed embodiment shows the camera mount on a right side of the headrest 10 and the seat 90. It should be noted that the camera cavity 36 and 94 may be located on the left side thereof, or the cavity may be formed on both sides of the headrest and seat. The support 38 is slidingly received in the slot 39 in the back of the seat 12. As may be appreciated, some seats in motor vehicles have a pair of spaced-apart slots which each receive a tubular member extending from a conventional headrest, and such supports are likewise included with the scope of the present invention as alternative supports 38. Other headrests include apparatus for pivoting the headrest to accommodate personal preferences in positioning, and the present invention may include such additional features.

The door 44 is pivoted open by detaching the pin 48 from the opening 54 and pulling the door at its distal end 52 downwardly towards the seat 12. The video camera 14 is inserted through the opening in the side of the headrest 10 into the cavity 36. The connector 22 is threadably engaged to the video camera 14 to secure the video camera 14 with the lens aligned with the opening 40. The cap 42 is detached during operation of the video camera. The door 44 is pivoted closed with the pin 48 engaging the opening 54. Also, the video camera maybe oriented so that the lens is pointed towards the port 45, for recording images to the side of the motored vehicle.

With reference to FIGS. 3 and 4, the cavity 36 may include the pivot plate 60. The connector 82 extending through the pivot plate 76 engages the video camera 14. The bolt 62 is loosened and the pivot plate 76 tilted about the bolt with the flange 94 disposed between the flanges 66, 68. The bolt 62 is tightened when the pivot plate 76 is at the selected angle. The lens of the video camera aligns with the opening in the headrest for recording images.

With reference to FIG. 5, the seat back 90 is preferably installed as original equipment by the manufacturer of the motor vehicle, although a secondary market is not excluded. The cover 106 is detached from the side of the seat back 90. The video camera 14 is inserted into the cavity 94 and attached to the support by the threaded connector. The cover 106 is reinstalled, after the video camera 14 is started. In an alternate embodiment, remote control devices are used to control the operation of the camera.

For police operations, the video camera 14 is connected by a cable to a controller for activation of the recording. The video camera 14 records automatically when the siren or lights are activated, and such control device is conventional. The headrest according to the present invention provides a conventional appearing headrest independently insertable into the backs of seats in motor vehicles or integrally included in seatbacks, with the cavity for holding a video camera for recording. It is preferred that the video recorder 124 be digital, for a smaller size to fit a conventional size seat bottom. In an alternate embodiment, the headrest 10 and seat 90 receive a lens device which communicates by a cable to a separate recorder mounted elsewhere in the motor vehicle.

With reference to FIG. 6, the video recording mount for motor vehicles according to the present invention is operated by pivoting the seat 122 from the closed position for seating to the upright open position for accessing the video recorder 124 as illustrated in FIG. 6. The cover 137 is unlocked and pivoted open. The video recorder 124 is operated to open the door 136 for insertion or removal of video recording tapes as appropriate. The cover 137 is then moved to the second position and secured closed with the lock 145. The seat 122 is pivoted to the closed position for seating. The video recorder 124 accordingly is readily accessible to a police officer for exchange of video tapes without undue difficulty. The video recorder 124 and cameras 14, 160 are preferably linked by the controller to the operation of the vehicle emergency lights and siren. The cameras 14, 160 and the recorder 124 commence operation upon activation of the emergency lights or siren. However, the controller also provides for manual activation of the cameras 14, 160 and the recorder 124. The controller further allows selecting between the cameras 14, 160 for selective recording of various views from around the motor vehicle. The video image received by the cameras is selective recorded on the tape in the video recorder 124, or two or more of the video signals can be recorded on the tape for subsequent playback and use. A conventional remote control device as well as a wireless microphone communicates with the recorder 124. The wireless microphone permits the audio of the activity outside the vehicle to be recorded. The present invention accordingly provides a comprehensive video surveillance monitoring and recording apparatus in a motor vehicle, together with ready and convenient access to the recorder 124, the video camera 14, and a display screen 152. In an alternate embodiment, the video cameras 14, 160 are incorporated within an integral headrest as illustrated in FIG. 5.

With reference to the embodiment illustrated in FIG. 7, the video recorder 124 is accessible by unlocking the lock 184 and sliding the drawer 174 from the first position to the second position outwardly of the face 180 of the seat 170. The video tape is inserted, or replaced, by operating the controls of the video recorder 124 which are conventional, for opening and closing the video tape chamber. The drawer 174 in the illustrated embodiment moves on the rollers 178, or glides, plastic blocks, and the like, traveling in the channel arms 176, although other sliding members may be gainfully used. The drawer 174 is pushed back into the seat 170 to the second position, and the lock 184 is locked.

As discussed above, the video recorder 124 and cameras 14, 160 are preferably linked by the controller to the operation of the vehicle emergency lights and siren. The controller can be in-dash, such as the illustrated video display 152 or locally to the seat. The cameras 14, 160 and the recorder 124 commence operation upon activation of the emergency lights or siren. However, the controller also provides for manual activation of the cameras 14, 160 and the recorder 124. The cameras 14, 160 are disposed laterally of the central portion of the seat back 186 to avoid interference by a person in the seat to the images received by the cameras. The controller further allows selecting between the cameras 14, 160 for selective recording of various views from around the motor vehicle. The video image received by the cameras is selective recorded on the tape in the video recorder 124, or two or more of the video signals can be recorded on the tape for subsequent playback and use. A conventional remote control device as well as a wireless microphone 190 (or direct microphone) communicates with the recorder 124. The wireless microphone permits the audio of the activity outside the vehicle to be recorded. The present invention accordingly provides a comprehensive video surveillance monitoring and recording apparatus in a motor vehicle, together with ready and convenient access to the recorder 124, the video camera 14, and a display screen 152. In an alternate embodiment, the video cameras 14, 160 are incorporated within an integral headrest as illustrated in FIG. 5.

The apparatus of FIG. 8 is used similarly, by accessing the recorder 124 through the door 200, which pivots on the hinge 202, whereby tapes can replaced as necessary.

It is thus seen that an improved headrest and seat video imaging apparatus is provided for mounting a video camera and recorder in a motor vehicle as an integrated system. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A video and audio imaging apparatus and motor vehicle seat for positioning in a motor vehicle for receiving video images and audio, comprising:

a frame for a seat having cushioning pads thereon defining a seat portion and a scat back portion, said frame defining a shape of the seat and the seat back portions, said seat back portion having a headrest portion therein;

means for covering the frame;

the seat back further defining a second portion spaced-apart and lateral of the headrest portion, which second portion includes means for mounting a video imaging apparatus thereto, whereby the video imaging apparatus is disposed laterally of the seat back and centrally relative to for imaging a central axis of said motor vehicle forwardly while being unobstructed by a passenger's head when the passenger's head is located immediately in front of the headrest portion;

a drawer slidably received within the seat portion for moving between a first position recessed within the seat and a second position extending outwardly of the seat for accessing a video image recorder secured within the drawer and being operatively connected with a control cable to the video imaging apparatus mounted to the seat back portion; and control means for selectively operating the camera and the recorder for recording images.

2. The video imaging apparatus and motor vehicle seat as recited in claim 1, wherein the second portion comprises:

a cavity defined within the seat back portion;

a support member disposed in the cavity and engaged to the frame of the seat back portion, the support member adapted for rigidly engaging said at least one video imaging apparatus; and a port in a side wall of the seat for entrance to the cavity, whereby the video imaging apparatus is inserted into the cavity for engagement to the support member.

3. The video imaging apparatus and motor vehicle seat as recited in claim 1, further comprising means for restricting access to a tape held in the video recorder.

4. The video imaging apparatus and motor vehicle seat as recited in claim 3, wherein means for restricting comprises a lock attached to a front panel of the drawer for engaging a portion of the seat, whereby the lock secures the drawer from being moved from the first position to the second position.

5. A video and audio imaging apparatus and vehicle seat for positioning in a vehicle for receiving video images, comprising:

a frame for a seat having cushioning pads thereon defining a seat portion and a seat back portion, said frame defining a shape of the seat and the seat back portions, said seat back portion having a headrest portion therein;

a cover for covering the frame;

the seat back further defining a second portion spaced-apart and lateral of the headrest portion;

a support disposed in the second portion for mounting a video imaging apparatus thereto, whereby the video imaging apparatus is disposed laterally of the seat back and centrally relative to a central axis of said vehicle for imaging forwardly while being unobstructed by a passenger's head when the passengers head is located immediately in front of the headrest portion; and a drawer slidably received within the seat portion for moving between a first position recessed within the seat and a second position extending outwardly of the seat for accessing a video image recorder secured within the drawer and being operatively connected with a signal communication cable to the video imaging apparatus mounted to the seat back portion.

6. The video and audio imaging apparatus and vehicle seat as recited in claim 5, further comprising a controller for selectively operating the video image apparatus and the video image recorder for recording images.

7. The video imaging apparatus and vehicle seat as recited in claim 5, wherein the second portion comprises a cavity defined within the seat back portion; and wherein the support comprises a member disposed in the cavity and engaged to the frame of the seat back portion, the support member adapted for rigidly engaging said at least one video imaging apparatus.

8. The video imaging apparatus and vehicle seat as recited in claim 5, wherein the second portion defines a port in a side wall of the seat for entrance to the cavity, whereby the video imaging apparatus is inserted into the cavity.

9. The video imaging apparatus and vehicle seat as recited in claim 5, further comprising a lock attached to a front panel of the drawer for engaging a portion of the seat, whereby the lock secures the drawer from being moved from the first position to the second position.

10. The video imaging apparatus and vehicle seat as recited in claim 5, wherein the seat back defines an arcuate portion defining a head rest integral with the seat back and the second portion is lateral thereof integral with the seat back.

11. The video imaging apparatus and vehicle seat as recited in claim 5, wherein the second portion comprises a portion of a head rest cushion for attachment to the seat in a vehicle by at least one elongate member and the second portion defining a cavity at a distal end of the cushion for enclosing the video imaging apparatus therein, and a surface of the cushion defining a first hole for being substantially in alignment with a lens of the video imaging apparatus.

12. The video imaging apparatus and vehicle seat as recited in claim 5, further comprising a microphone with a communication pathway for providing an audio signal to the video image recorder.

13. The video imaging apparatus and vehicle seat as recited in claim 5, further comprising a video image display operatively connected to the video image recorder for display of video images, said video image display mounted to a structure of the vehicle.

14. A video and audio imaging apparatus and vehicle seat for positioning in a vehicle for receiving video images, comprising:

- a frame for a seat having cushioning pads thereon defining a seat portion and a seat back portion, said frame defining a shape of the seat and the seat back portions, said seat back portion having a headrest portion therein;
- a cover for covering the frame;
- the seat back further defining a second portion spaced-apart and lateral of the headrest portion;
- a support disposed in the second portion for mounting a video imaging apparatus thereto, whereby the video imaging apparatus is disposed laterally of the seat back and centrally relative to a central axis of said vehicle for imaging forwardly while being unobstructed by a passenger's head when the passenger's head is located immediately in front of the headrest portion;
- a drawer slidably recieved within the seat portion for moving between a first position recessed within the seat and a second position extending outwardly of the seat for accessing a video image recorder secured within the drawer and being operatively connected with a signal communication cable to the video imaging apparatus mounted to the seat back portion;
- a controller for selectively operating the video image apparatus and the video image recorder for recording images;
- a microphone with a communication pathway for providing an audio signal to the video image recorder; and
- a video image display operatively connected to the video image recorder for display of video images, said video image display mounted to a structure of the vehicle.

* * * * *